Nov. 28, 1967 R. B. FULLER 3,354,591
OCTAHEDRAL BUILDING TRUSS
Filed Dec. 7, 1964 6 Sheets-Sheet 1

INVENTOR.
RICHARD BUCKMINSTER FULLER
BY
*Robertson, Smythe & Bryan*
ATTORNEYS.

Nov. 28, 1967  R. B. FULLER  3,354,591
OCTAHEDRAL BUILDING TRUSS

Filed Dec. 7, 1964  6 Sheets-Sheet 2

INVENTOR.
RICHARD BUCKMINSTER FULLER
BY
*Robertson, Smythe & Bryan*
ATTORNEYS.

INVENTOR.
RICHARD BUCKMINSTER FULLER
BY
Robertson, Smythe & Bryan
ATTORNEYS.

Nov. 28, 1967 R. B. FULLER 3,354,591
OCTAHEDRAL BUILDING TRUSS
Filed Dec. 7, 1964 6 Sheets-Sheet 4
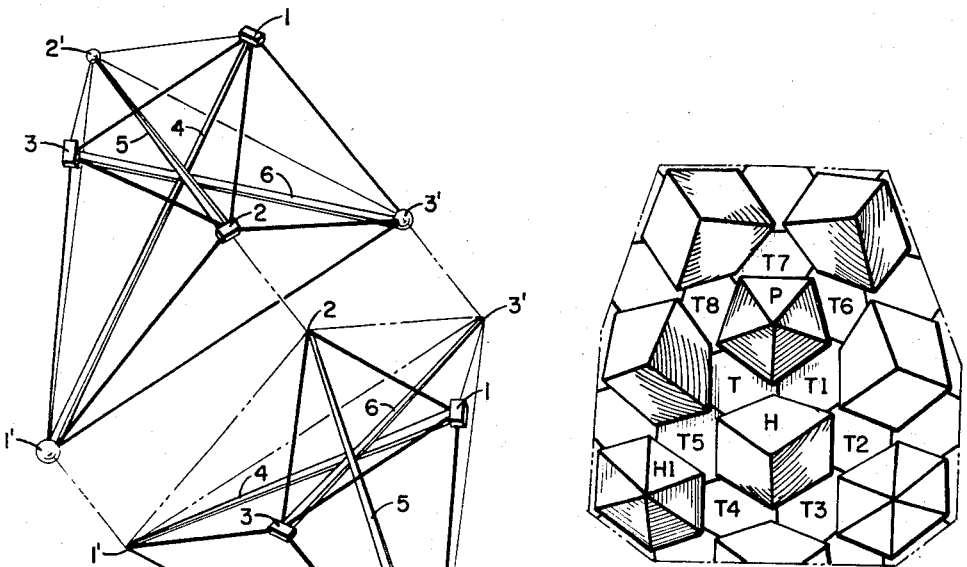
FIG. 7
FIG. 10
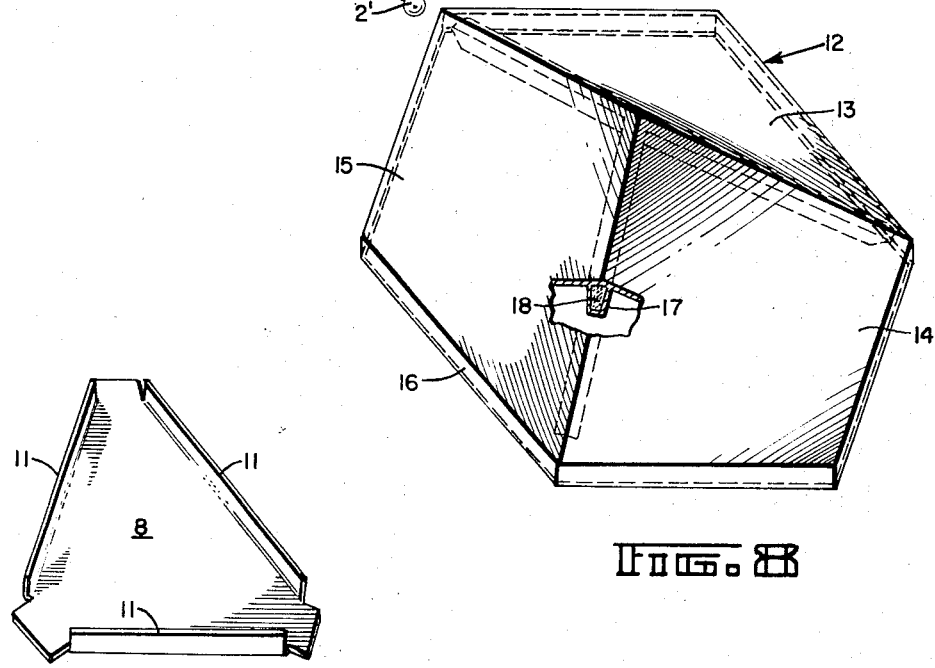
FIG. 8
FIG. 9
INVENTOR.
RICHARD BUCKMINSTER FULLER
BY
*Robertson, Smythe & Bryan*
ATTORNEYS.

Nov. 28, 1967 R. B. FULLER 3,354,591
OCTAHEDRAL BUILDING TRUSS
Filed Dec. 7, 1964 6 Sheets-Sheet 5
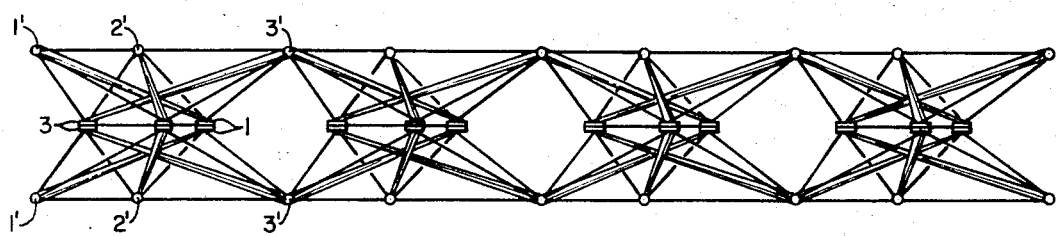
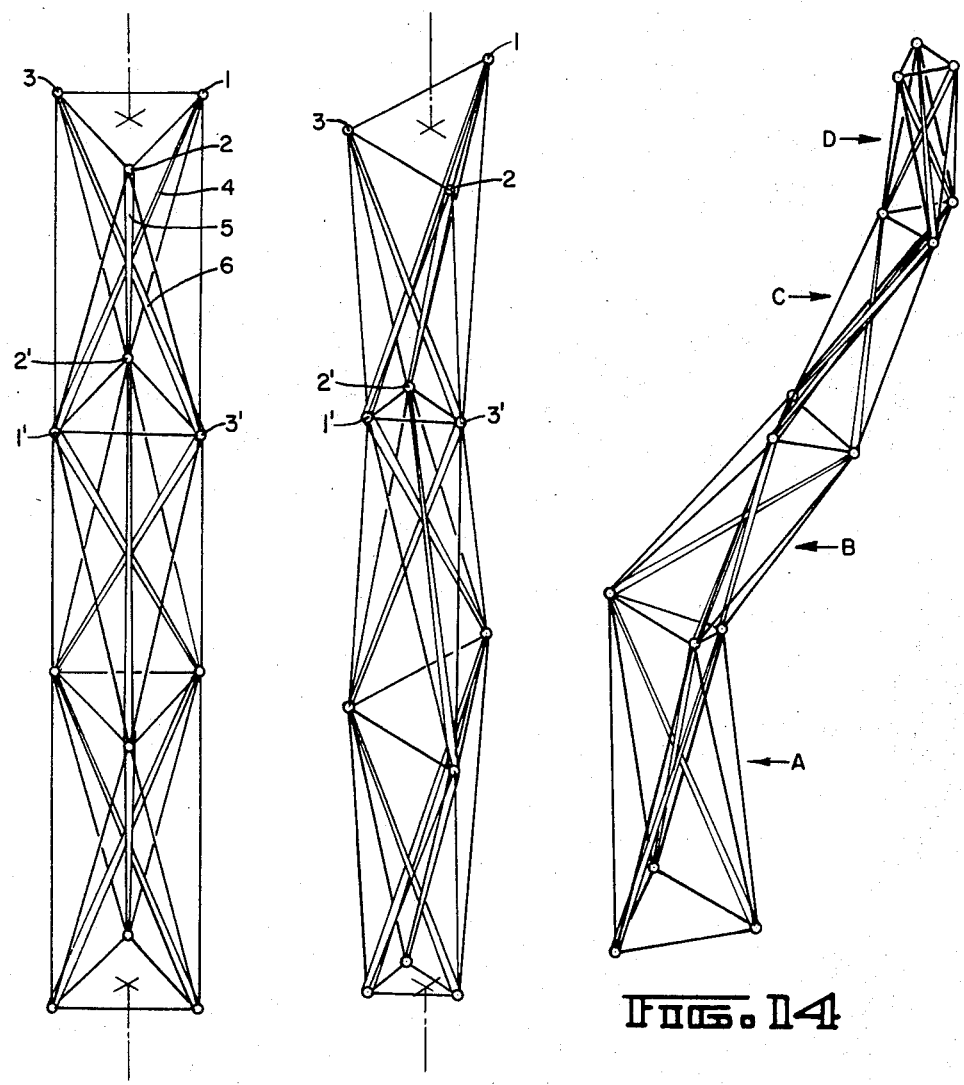
INVENTOR.
RICHARD BUCKMINSTER FULLER
BY
*Robertson, Smythe & Bryan*
ATTORNEYS.

Nov. 28, 1967   R. B. FULLER   3,354,591
OCTAHEDRAL BUILDING TRUSS

Filed Dec. 7, 1964   6 Sheets-Sheet 6

INVENTOR.
RICHARD BUCKMINSTER FULLER
BY
*Robertson, Smythe & Bryan*
ATTORNEYS.

United States Patent Office 3,354,591
Patented Nov. 28, 1967

3,354,591
OCTAHEDRAL BUILDING TRUSS
Richard Buckminster Fuller, 407 S. Forest St.,
Carbondale, Ill. 62901
Filed Dec. 7, 1964, Ser. No. 416,228
12 Claims. (Cl. 52—81)

The invention relates to a building truss particularly adapted to the construction of geodesic domes and having special advantages for use in other kinds of structures as well.

Advances in the technology of materials have resulted in the discovery of the means for producing remarkable increases in tensile strength properties of the materials. Noticeably this has been true in the field of metal alloys, ferrous and nonferrous. Materials of great tensile strength have been developed also in plastics. Glass fibers of enormous strength have become available and are widely used. Notwithstanding the general availability of such high tensile properties in materials, comparatively little has been done in the direction of utilizing pure tension elements in building construction. For building purposes, engineers have clung tenaciously to age-old concepts which rely primarily upon the compressive strength of the materials used so that structures have been erected stone upon stone, beam upon column, all with the utilization of a vast deadweight of materials. With the use of the somewhat lighter weight girders now employed, for example, in the construction of floors and roofs of conventional buildings, some increase in use of the tensile properties of materials has been made, but still relying to a great extent on the presence of large and heavy compression members.

Summary

It has been a primary object of my invention to provide a truss construction which is capable of utilizing more efficiently the tensile strengths of the materials from which the truss is constructed. I have found a way of building a truss which allows the use of many elements loaded purely in tension, indeed, one in which such purely tensioned elements predominate, so that relatively few compression members are needed. Further, I have discovered how to do this in a way which provides a smooth surface well adapted to cladding in the construction of floors, roofs and walls, and which is remarkably well adapted to the construction of spherical form buildings inclusive of buildings known as geodesic domes.

A particular characterizing feature of my present invention resides in putting together in a new way a plurality of units of octahedral form each having eight triangular faces, such units being connected face to face so that each pair of adjacent units have one face thereof in congruity. In the preferred form of my truss, each of the interconnected units comprises twelve flexible members capable of being stressed only in pure tension and three compression elements consisting of criss-crossed stiff members capable of being loaded as compression columns. Regarding the fundamental purpose of the invention, it is, of course, of the utmost significance that we have here a ratio between pure tension and pure compression of four to one. (If when six units are interconnected in the manner shown in FIG. 3, only one set of tension elements is used where the congruent faces are found, some of the tension elements will be leiminated and the ratio between tension and compression elements will become three to one.) Yet, as will be explained hereinbelow, this predominance of tension elements—which can even be slender wires or cables—is accomplished in a way to provide a smooth planar or spherical surface for cladding in a most convenient manner.

Description

The accompanying drawings show the best mode contemplated by me for carrying out my invention.

FIG. 7 is an exploded view of one pair of octahedral units used in the FIG. 3 truss.

FIG. 8 is a top perspective view of a six-sided capping member which forms a part of the cladding shown in FIG. 2.

FIG. 9 is a top perspective view of a triangular capping member which forms another part of the cladding shown in FIG. 2.

FIG. 10 is a diagram showing the relationship between several types of elements which can form a part of a geodesic dome constructed in accordance with the invention.

FIG. 11 is a view similar to FIG. 4, showing a modified construction.

FIG. 12 is a side elevational view of a mast structure embodying my invention in another form.

FIG. 13 is a view similar to FIG. 12, showing a modified form of mast structure.

FIG. 14 is a view illustrating an application of the invention to a structure of assymmetrical form.

Figure 5:
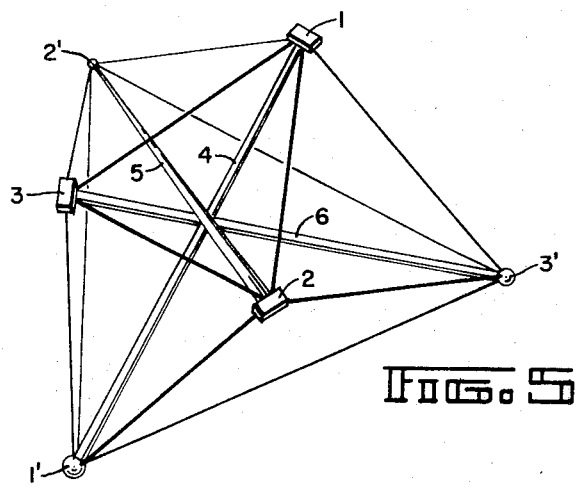
FIG. 5 is a detail view of one of the six octahedral units which together make up the truss section of FIG. 3.

With reference to FIG. 5, I shall first describe one of the octahedral "building blocks" which form the basic unit of the construction. It has eight triangular faces and is, therefore, an octahedron. The eight triangular faces are defined by the tension elements which normally will be made of flexible wires or cables. There are three compression elements, 4, 5, and 6, which are arranged along the three axes of the octahedron, 1–1', 2–2' and 3–3'. In reading FIGS. 3, 5, 6 and 7, it will be helpful to note the following: The reader is looking top down on the truss and truss units. The upper ends of the compression elements 4, 5 and 6 lie in one plane and the lower ends lie in another plane below the first. Unprimed numbers are used for those points which lie in the upper surface, and primed numbers for those which lie in the lower surface. Further, the points lying in the upper surface are marked by rectangles (rectangular elements) and those in the lower surface by circles or spheres. As an additional aid to the reader, the perspective has been heightened by an exaggerated fore-shortening of the compression members 4, 5 and 6 so that they will appear larger at the end near to the reader.

Interconnection of adjacent units in face to face relationship will be understood from FIG. 7 in which two adjacent units have been drawn apart slightly. When brought together, the faces 1'–2–3' of the two units shown will be congruent. In the unit which appears in the lower part of FIG. 7, the tensile lines 1'–2, 2–3', and 1'-3' have been shown as imaginary lines, for when the two units are brought together the tension elements 1'-2, 2-3' and 1'-3' of the upper unit can serve as common tension elements of the two associated units as may in some cases be desired.

Figure 3:
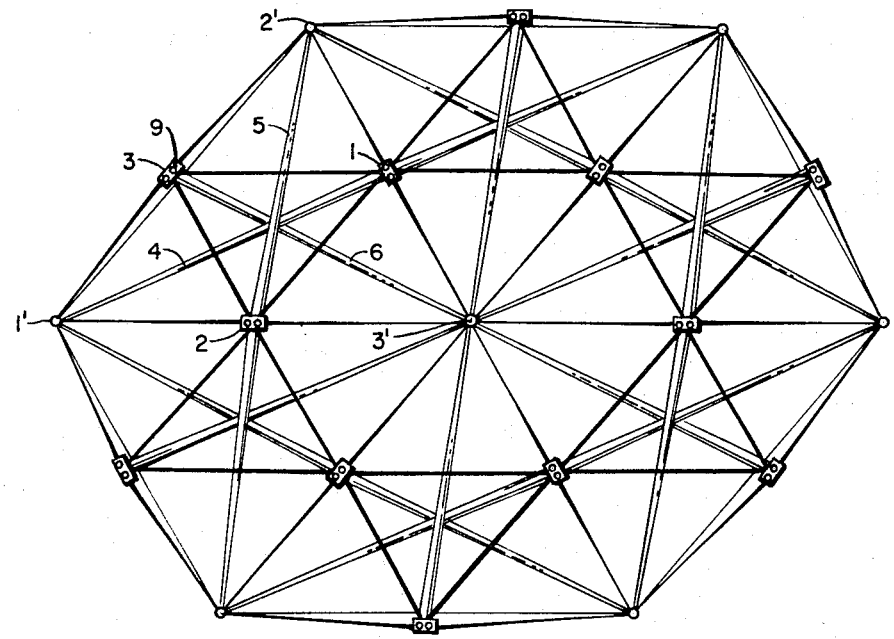
FIG. 3 is a view similar to FIG. 2 but with all of the cladding elements removed to reveal all of the elements of the truss.

In FIG. 3 we see six associated octahedral units of FIG. 5, each adjacent pair of such units being interconnected in the manner I have described with reference to FIG. 7. The interconnected units form a trus structure comprising a network of tension elements arranged in a pattern defining a plurality of the FIG. 5 octahedra in face to face relationship as depicted in FIG. 7. A compression member 4, 5 or 6 extends between each of the three opposed pairs of vertexes of each octahedron. This description of my construction may now be summarized more simply as a truss structure comprising tension elements defining octahedra arranged face to face, and compression elements arranged along the three axes of each octahedron.

The seemingly complex but truly simple forms of the octahedral units will be further understood by identifying the faces of the octahedra, the tension elements and the compression elements as follows:

Eight faces of the octahedra:
 1-2-3
 1'-2'-3'
 1-2-3'
 1'-2-3
 1-2'-3
 1-2'-3'
 1'-2-3'
 1'-2'-3

Twelve tension elements:
 1-2
 2-3
 3-1
 1'-2'
 2'-3'
 3'-1'
 1-2'
 1-3'
 2-3'
 2-1'
 3-1'
 3-2'

Three compression elements:
 4
 5
 6

From the foregoing tabulation of the truss elements, the student of this disclosure will appreciate the preponderance in tension elements over compression elements and the significant improvement thus obtained in the direction of increased utilization of the high tensile properties of the improved materials and alloys available today. The problem heretofore has not been the availability of materials of good tensile properties, but rather the question of how such properties could be utilized more fully in the realm of building architecture; and how this could be done in a practical manner which would provide surfaces which could conveniently be cladded—even though such surfaces seem to be made up of a maze of wires and to be inherently "spikey." How this can be done is now further disclosed with more particular reference to FIGS. 2, 4, 8 and 9 of the drawings:

If we take a truss section of the extent comprised of six associated octahedra, it will be noticed that one face (1-2-3) of each of the six octahedra lies in a common surface. These faces of the six octahedral units are joined together vertex to vertex, and together encircle a hexagonal area. The six triangular faces 1-2-3 are enclosed by triangular capping members 8 which may be secured in any convenient manner as by bolting them to fittings 1, 2 and 3, FIG. 5, which may be apertured as at 9, FIG. 3, to receive bolts passing through aligned apertures 10 in overlapping corner portions of the triangular capping members. By this means, the capping members are secured to each other and to the underlying truss. In the preferred construction shown, the triangular capping members 8 are formed as panels having upwardly extending marginal flanges 11, FIG. 9. The hexagonal area within the circle of triangular panels 8, FIG. 2, may then be enclosed in any suitable manner. This may be done most advantageously with the use of a hexagonal capping member 12, FIG. 8, having downwardly extending marginal flanges 16 which fit over the upwardly extending flanges 11 at the edges of the hexagonal area. The hexagonal capping member 12 is advantageously formed with three adjoining diamond-shaped surfaces 13, 14, and 15 of hyperbolic-paraboloid form. Various materials may be employed in the cladding of the structure including formed or molded sheets of steel, aluminum, plastics, fiberglass or other suitable materials. In the representative construction shown, the triangular capping members 8 are made of steel and the six-sided capping members 12 are made of fiberglass-reinforced polyester resin. In the construction shown in FIG. 8, this capping member is further reinforced along the ridges formed by the adjoining edges of the hyperbolic-paraboloids by hollow molded ribs 17 filled with a urethane foam 18. (The cladding construction which I have described forms an effective watershed by reason of the interlocking flanges of the several cladding members and the arrangement by which the water can flow from one triangular panel to another. These panels together form a maze of gutters which will serve to clear a heavy flow of rainwater.)

Figure 6:
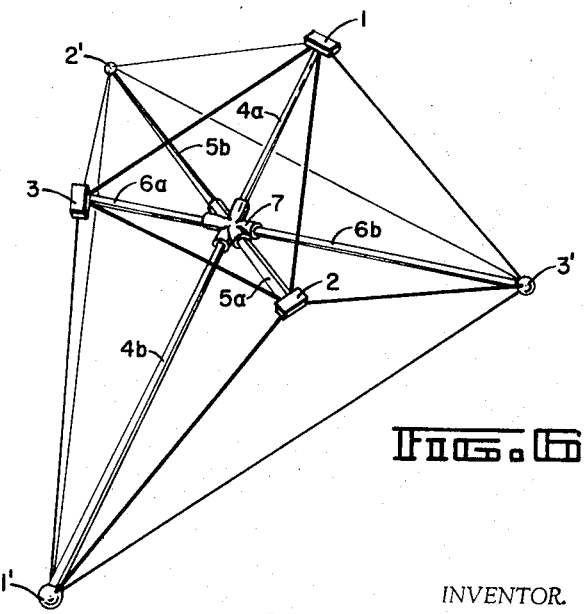
FIG. 6 is a view similar to FIG. 5 illustrating a modified form of the octahedral unit.

In FIG. 6, I have illustrated a modified form of the fundamental octahedral unit in which the compression members extending between each of the three opposed pairs of vertexes 1-1', 2-2' and 3-3' of the octahedron are each made in two parts joined together centrally of the unit by a hub member 7 provided with three pairs of fittings aligned with the respective axes of the compression members. It will be observed that in the embodiment shown in FIG. 5, the compression members 4, 5 and 6 are arranged to bypass one another in the manner of the poles of a tepee. At the point of bypass, the members may be spaced from one another or be in contact. They may or may not be secured to one another at the point of bypass as desired. In the embodiment of FIG. 6, the compression members can be arranged so that their axes intersect, the single members 4, 5 and 6 here being replaced by the compound compression members 4a–4b, 5a–5b, 6a–6b, respectively.

Figure 1:
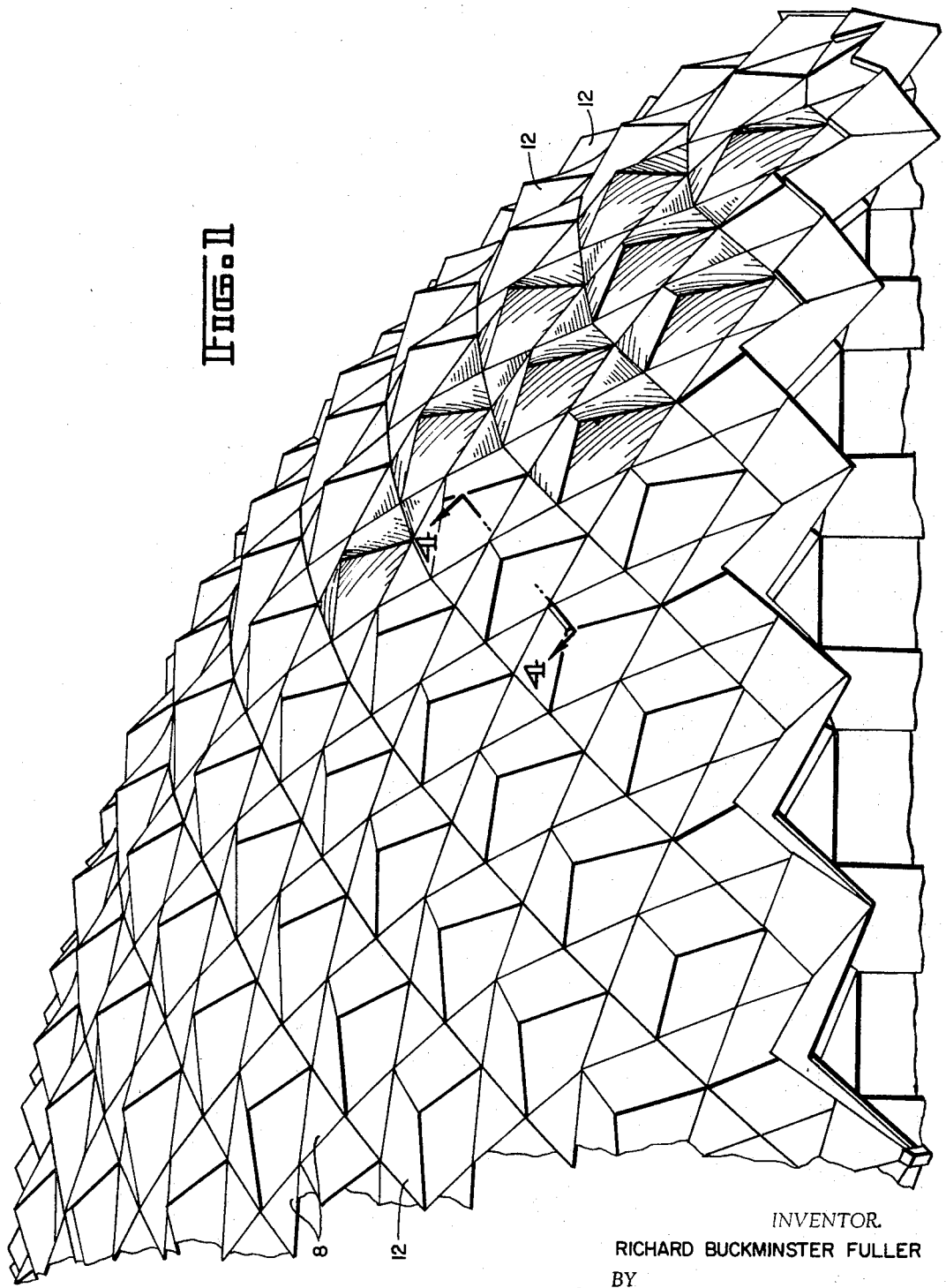
FIG. 1 is a side elevational view of a portion of a geodesic dome constructed in accordance with my invention.
Figure 2:
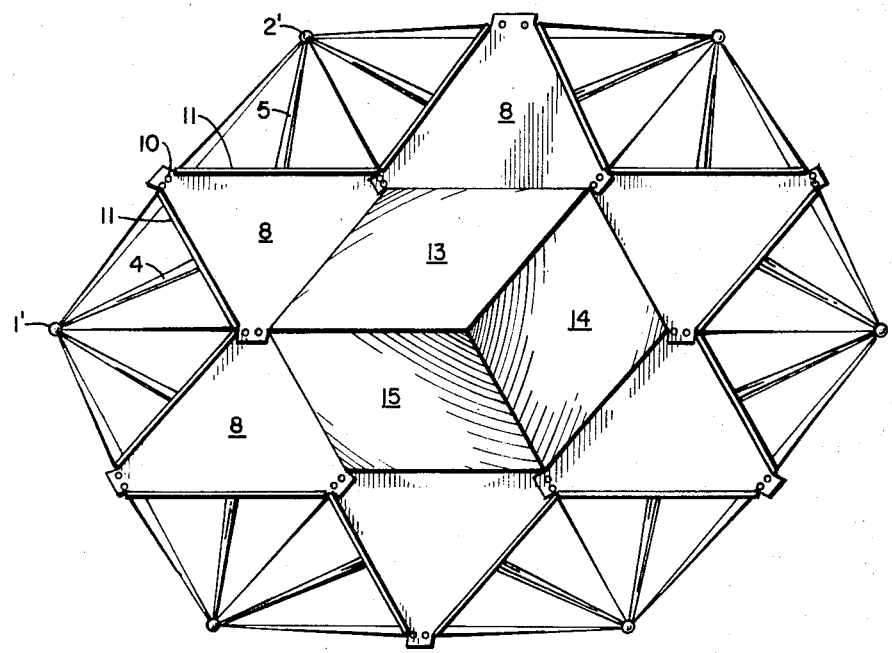
FIG. 2 is a face view of a portion of the surface of the structure of FIG. 1 with some of the cladding panels removed to reveal a portion of the underlying truss.

When my invention is utilized in geodesic dome construction, some of the octahedral units will be arranged so that their triangular capping members encircle a pentagonal area as distinguished from the hexagonal area described with reference to FIGS. 2 and 3. This occurs at each vertex of the icosahedron, dodecahedron or tricontahedron on which the design of the geodesic dome is based. This aspect of geodesic construction is well known to architects familiar with such construction, and will be understood from the disclosure of my fundamental geodesic building construction Patent No. 2,682,235 where the pentagonal areas can be seen clearly in FIGS. 1 and 2. Thus in a geodesic dome constructed in accordance with my present invention, some of the octahedral units are arranged so that one face of each of six associated units lies in a common spherical surface, such faces of the six associated units being joined together vertex to vertex and enclosed by triangular capping members which encircle a hexagonal area in the common spherical surface, such hexagonal area being enclosed by a six-sided capping member adjoining each of the six triangular capping members; whereas, others of the octahedral units are arranged so that their triangular capping members encircle a pentagonal area in the common spherical surface, such pentagonal area being enclosed by a five-sided capping member adjoining each of the five triangular capping members. This will be further understood from the diagram of FIG. 10. The area covered by this diagram can be compared with the area at the zenith Z of my geodesic patent aforesaid. Triangular capping members T, T1, T2, T3, H4, T5 encircle a hexagonal area which is enclosed by a six-sided capping member H which might, for example, be of the construction which has been described with reference to FIG. 8. Triangular capping members T, T1, T6, T7, T8 encircle a pentagonal area enclosed by a five-sided capping member P. Capping member P may be of simple pyramidal form as distinguished from the hyperbolic-paraboloid form of FIG. 8, or H in the diagram. Further, the form of the six-sided capping members may be modified according to the wishes of the architect; for example, they may be of the simple pyramidal form shown at H1 in the diagram.

Figure 4:
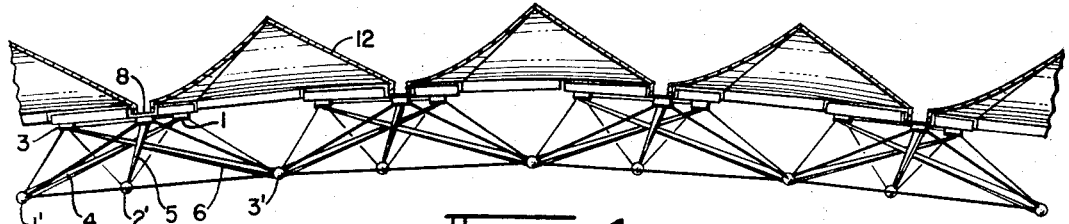
FIG. 4 is a fragmentary cross sectional view taken generally as indicated at 4—4 in FIG. 1, the scale being somewhat enlarged.

FIG. 11 illustrates a further development of the construction of FIG. 4, in which the proportions of the octahedral units are altered to create a flat floor or roof truss. This truss is then built up into two or more thicknesses (two as shown) in which every other truss is inverted. Here the smaller faces 1–2–3 of the two trusses are joined congruently. Similarly, two trusses may be joined in a manner which brings the larger faces 1′–2′–3′ into congruent relation.

FIG. 12 illustrates the application of my invention to a mast or tower structure. In this case the opposed faces 1–2–3 and 1′–2′–3′ of the octahedrons are of the same size, and parallel to one another.

FIG. 13 illustrates a modification of the FIG. 12 structure in which opposed faces 1–2–3 and 1′–2′–3′ are of different size, and are not parallel to one another.

FIG. 14 illustrates an application of my invention to an asymmetrical structure which reveals the comprehensive adaptability of my invention to structures of irregular form. The octahedrons A, B, C, D, etc., can be varied in their relative proportions and shapes, grouped and extended as desired, while availing of the favorable weight-strength ratio obtained by reason of the preponderance of tension elements over compression elements.

Figure 15:
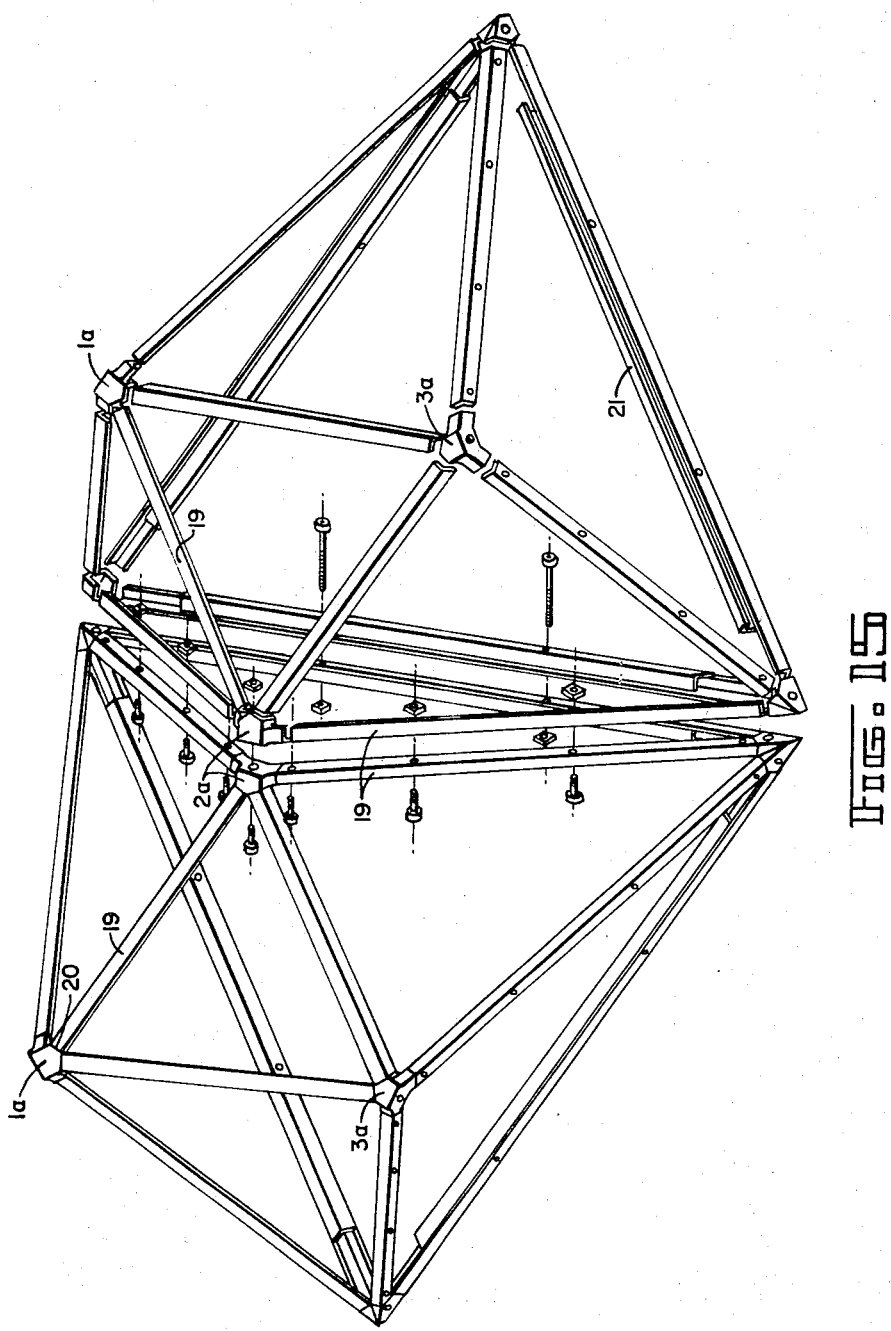
FIG. 15 is a perspective view, partially exploded, showing elements of two associated octahedral units constructed in accordance with another embodiment of the invention.

FIG. 15 illustrates a further modification of the octahedral units in which the twelve edges of each octahedron are in the form of structural shapes such as the "angle irons" of steel or aluminum shown at 19. Vertex members 1a, 2a and 3a correspond to members 1, 2 and 3 of FIGS. 5, 6 and 7. These are advantageously made as metal castings to which the structural shapes 19 are welded as 20. The construction thus comprises a plurality of interconnected units each of which comprises twelve members interconnected to form the edges of a self-supporting unit having eight triangular faces, the units being connected face to face so that each pair of adjacent units have one face and three members thereof in congruity. The faces which are connected in congruity are those which are shown spaced slightly apart, these faces being designed to be bolted together in the manner indicated by the exploded bolting elements, which pass through aligned apertures in the congruent edge members.

In each of the embodiments described, my structure comprises a plurality of interconnected units each of which includes twelve members interconnected to form the edges of a figure having eight triangular faces, an outer face of the several units lying in a common surface and an inner face of the several units lying in a second common surface spaced from and parallel to the first. For example, in the embodiment of FIGS. 1–5 and 7, and with particular reference to FIG. 5, we have an outer face 1–2–3 and an inner face 1′–2′–3′, these two faces lying in surfaces which are spaced from and parallel to one another. Notice that the outer face 1–2–3 is approximately one-half the size of the inner face 1′–2′–3′ and that the two faces are so oriented relative to one another that the vertices of the outer face lie substantially above the midpoints of the sides of the inner face. "Above" is used here in the sense of "beyond" or "outside of"; and it will be understood that if the truss extends in a generally horizontal direction, vertex 2, for example, of the outer face 1–2–3 will lie above the side 1′–2′–3′ of the inner face 1′–2′–3′, whereas, if the truss is located so as to extend in a generally vertical direction, vertex 2 will be beyond or outside of side 1′–3′. If the inner and outer surfaces of the truss are parallel flat planes arranged horizontally, vertex 2 will be directly above side 1′–3′. Again, if the common surfaces are concentric spherical surfaces, vertex 2 will be disposed radially outside of the midpoint of side 1′–3′. So in all cases it can be considered that the orientation of the outer and inner faces of each unit is such that the vertices 1, 2, and 3 of the outer face lie substantially "above" the midpoints of the sides of the inner face 1′–2′–3′.

The relative size and orientation of the inner and outer faces of each unit as described in the preceding paragraph makes it possible to interconnect the several units in a manner which joins the outer faces together vertex to vertex and which joins the inner faces together edge to edge. If the truss is inverted or turned inside out, the inner faces will be joined together vertex to vertex and the outer faces edge to edge.

The terms and expressions which I have employed are used in a descriptive and not a limiting sense, and I have no intention of excluding equivalents of the invention described and claimed.

I claim:

1. A truss structure comprising a network of tension members and compression members; the tension members being joined in three opposed pairs of junctions, the junctions of the tension members forming vertices lying in planes defining an octahedron, said tension members of adjacent octahedra being connected, with the connections therebetween defining a common plane of said adjacent octahedra, and said compression members extending between each of said three opposed pairs of junctions of said tension members of each octahedron.

2. A truss structure comprising a network of tension members and compression members; the tension members being joined in a multiplicity of three opposed pairs of junctions, the junctions of the respective tension members forming three opposed pairs of vertices lying at the vertices of eight triangular faces defining an octahedron, said tension members of adjacent octahedra being connected, the adjacent octahedra being positioned with a triangular face of one in face to face relationship with a triangular face of another, the connections between adjacent octahedra defining a first and a second common surface, one of the triangular faces of each octahedron lying in said first common surface and another of the triangular faces of each octahedron lying in said second common surface, and three of said compression members being positioned in criss-crossed relationship and extending between each of said three opposed pairs of junctions of each octahedron.

3. A truss structure for a geodesic dome comprising a plurality of interconnected self-supporting units each of which comprises twelve members interconnected at six junctions forming vertices of the respective units and with said twelve members forming the edges of the respective units, each unit having eight triangular faces, said units being connected face to face so that each pair of adjacent units have one face and three members thereof in congruity.

4. A truss structure in accordance with claim 3 in which one face of each of six associated units lies in a common spherical surface, said faces of said six associated units being joined together vertex to vertex and each being closed by respective ones of six triangular capping members which encircle a hexagonal area in said common spherical surface, said hexagonal area being enclosed by a six-sided capping member adjoining each of the six triangular capping members.

5. A truss structure in accordance with claim 3 in which one face of each of six associated units lies in a common spherical surface, said faces of said six associated units being joined together vertex to vertex and each being closed by respective ones of six triangular capping members which encircle a hexagonal area in said common spherical surface, said hexagonal area being enclosed by a six-sided capping member adjoining each of the six triangular capping members, said six-sided capping member being formed with three adjoining diamond-shaped surfaces of hyperbolic-paraboloid form.

6. A truss structure in accordance with claim 4 in which one face of each of five other associated units lies in said common spherical surface, said faces of said five associated units being joined together vertex to vertex and being closed by respective ones of five triangular capping members which encircle a pentagonal area in said common spherical surface, said pentagonal area being enclosed by a five-sided capping member adjoining each of the five triangular capping members.

7. A truss structure comprising a plurality of interconnected units each of which includes twelve members interconnected at six junctions forming six vertices of the respective units and with said twelve members of the respective units forming the edges thereof, the respective units each having eight triangular faces including an outer face and an inner face, the outer face of the respective units lying in a common surface and the inner face of the respective units lying in a second common surface spaced from and parallel to the first, said outer faces being approximately one-half the size of said inner faces and the outer and inner faces of each unit being so oriented relative to one another that the vertices of the outer face lie substantially above the mid-points of the edges of the inner face, the respective units being interconnected in a manner which joins the outer faces together vertex to vertex and the inner faces edge to edge.

8. A truss structure according to claim 7 in which said first and second common surfaces are parallel flat planes.

9. A truss structure according to claim 7 in which said first and second common surfaces are parallel curved surfaces.

10. A truss structure according to claim 7 in which said first and second common surfaces are concentric spherical surfaces.

11. A truss structure comprising a plurality of interconnected units each of which includes twelve members interconnected at six junctions forming six vertices of the respective units and with said twelve members of the respective units forming the edges thereof, the respective units each having eight triangular faces including a first face and a second face, the first face of the respective units lying in a common surface and the second face of the respective units lying in a second common surface spaced from and parallel to the first common surface, one of said first and second faces of each unit being approximately one-half the size of the other of said first and second faces, and said first and second faces of each unit being so oriented relative to one another that the vertices of one such face lie substantially opposite the midpoints of the edges of the other such face, the respective units being interconnected in a manner which joins one of said first and second faces of the respective units together vertex to vertex and which joins the other of said first and second faces of the respective units together edge to edge.

12. A truss structure comprising a plurality of interconnected units each of which includes twelve members joined at six junctions forming three opposed pairs of vertices of the respective units and with said twelve members of the respective units forming the edges thereof, the respective units each being an octahedral figure having eight triangular faces including a first such triangular face and a second such triangular face, the first such face of the respective units lying in a common surface and the second such face of the respective units lying in a second common surface spaced from and parallel to the first common surface, said twelve members of the respective interconnected units being constituted by flexible members capable of being stressed only in pure tension and each of said units further including three criss-crossed stiff members capable of being loaded as compression columns, said stiff members extending between each of the three opposed pairs of vertices of the octahedral figure formed by said eight triangular faces.

References Cited

UNITED STATES PATENTS

| 2,918,992 | 12/1959 | Gelsavage | 52—81 |
| 3,058,550 | 10/1962 | Richter | 52—582 X |
| 3,169,611 | 2/1965 | Snelson | 52—578 X |
| 3,220,152 | 11/1965 | Sturm | 52—81 X |

FOREIGN PATENTS

| 1,377,290 | 9/1964 | France. |
| 1,377,291 | 9/1964 | France. |

FRANK L. ABBOTT, *Primary Examiner.*

C. G. MUELLER, *Assistant Examiner.*